US 11,770,507 B2

(12) United States Patent
Welsch et al.

(10) Patent No.: US 11,770,507 B2
(45) Date of Patent: Sep. 26, 2023

(54) ARRANGEMENT FOR DATA RECORDING AND SAMPLING FOR AN AGRICULTURAL MACHINE

(71) Applicant: DEERE & COMPANY, Moline, IL (US)

(72) Inventors: Stefan T. Welsch, Mandelbachtal (DE); Mahesh Somarowthu, Tenali (IN); Georg A. Kormann, Zweibruecken (DE); Stefan Bohrer, St.Wendel (DE); Suvendu Ranjan Mallick, Bhadrak (IN)

(73) Assignee: DEERE & COMPANY, Moline, IL (US)

( * ) Notice: Subject to any disclaimer, the term of this patent is extended or adjusted under 35 U.S.C. 154(b) by 0 days.

(21) Appl. No.: 17/808,306

(22) Filed: Jun. 23, 2022

(65) Prior Publication Data

US 2023/0042046 A1    Feb. 9, 2023

(30) Foreign Application Priority Data

Aug. 4, 2021 (DE) .......................... 102021120327.9

(51) Int. Cl.
*H04N 7/18* (2006.01)
*A01D 43/08* (2006.01)
*A01D 41/127* (2006.01)

(52) U.S. Cl.
CPC .......... *H04N 7/188* (2013.01); *A01D 43/085* (2013.01); *A01D 41/1271* (2013.01);
(Continued)

(58) Field of Classification Search
CPC ....... A01M 7/0042; H04N 7/18; H04N 23/50; H04N 23/00; H04N 7/183; H04N 7/188;
(Continued)

(56) References Cited

U.S. PATENT DOCUMENTS

| 2013/0211675 | A1* | 8/2013 | Bonefas | ................. B62D 12/02 |
| | | | | 701/41 |
| 2015/0262351 | A1* | 9/2015 | Dima | ........................ G06T 7/90 |
| | | | | 382/110 |

(Continued)

FOREIGN PATENT DOCUMENTS

| DE | 19922867 A1 | 11/2000 |
| DE | 102012211001 A1 | 1/2014 |

(Continued)

OTHER PUBLICATIONS

M. Ewers et al., NIR-Sensor for determination of product quality of grain while combining, VDI-Berichte Nr. 1958, 2006, pp. 163-164.

*Primary Examiner* — Jared Walker

(57) ABSTRACT

An arrangement for data recording and sampling for an agricultural machine includes a sensor set-up arrangement to detect properties contained in a material stream, means of taking a sample of the material from the material stream, and an electronic control unit. The control unit is configured to perform the following steps in response to a tripping signal: (a) instruct an actuator to bring the means into a position for sampling; (b) starting a recording of raw sensor arrangement data in a memory; (c) after depositing the sample at a desired sampling location, stop recording the raw data and instruct the actuator to return the means from the sampling position to an inactive position; and (d) store identification data to identify the sample together with the raw data in memory.

10 Claims, 3 Drawing Sheets

(52) U.S. Cl.
CPC ...... *A01D 41/1272* (2013.01); *A01D 41/1273* (2013.01); *A01D 41/1277* (2013.01)

(58) Field of Classification Search
CPC .............. A01D 43/085; A01D 41/1277; A01D 41/1271; A01D 41/1272
See application file for complete search history.

(56) References Cited

U.S. PATENT DOCUMENTS

| | | | | |
|---|---|---|---|---|
| 2019/0277687 | A1* | 9/2019 | Blank | B60W 30/18 |
| 2021/0323015 | A1* | 10/2021 | Harmon | A01M 7/0042 |
| 2022/0022375 | A1* | 1/2022 | Murray | A01D 41/127 |
| 2022/0408645 | A1* | 12/2022 | O'Connor | A01D 41/1217 |

FOREIGN PATENT DOCUMENTS

| | | |
|---|---|---|
| DE | 102018213215 A1 | 2/2020 |
| EP | 1378742 A2 | 1/2004 |
| EP | 1736044 A1 | 12/2006 |
| EP | 1956361 A2 | 8/2008 |
| EP | 2232978 A1 | 9/2010 |
| EP | 2591654 A1 | 5/2013 |
| NL | 1008931 C1 | 10/1999 |

* cited by examiner

ARRANGEMENT FOR DATA RECORDING AND SAMPLING FOR AN AGRICULTURAL MACHINE

CROSS-REFERENCE TO RELATED APPLICATIONS

This application claims the benefit of German Patent Application No. DE 102021120327.9, filed on Aug. 4, 2021, the disclosure of which is hereby incorporated by reference.

TECHNICAL FIELD

The disclosure generally relates to an arrangement for data recording and sampling for an agricultural machine in which a material stream, e.g., crop material, is received, processed, stored and/or delivered during operation.

BACKGROUND

There are a number of agricultural applications where a sample of material, being picked up, processed, stored or delivered by a machine, is to be taken. Typical examples of this are cleaned grain in a combine harvester, manure filled into or removed from a slurry tank, or chopped crops in a forage harvester. In many cases, one or more certain properties of the material are detected by a sensor arranged on the machine and the sample is filled into a container to be analyzed later in a laboratory so that a comparison can be made between the sensor value and the associated value determined in the laboratory, whether to validate the sensor or to provide calibration data for the sensor.

For this purpose, reference is made to M. Ewers et al., NIR-Sensor for determination of product quality of grain while combining, VDI Reports No. 1958, 2006, pages 163-164, with a near-infrared (NIR) analysis in a bypass of conveyed grain in a combine harvester with automatic insertion of the analyzed sample into a container for subsequent wet chemical analysis, EP 1 736 044 A1 with deposition of a shell for picking up loss grains on a combine harvester, NL 1008931 C with removal of a sample of manure into a container, and EP 1 378 742 A2 with sampling from an ejection spout of a forage harvester. The time of sampling can be triggered by an operator, or a sample is taken at certain intervals, or it takes place when a sensor provides certain values, e.g. not yet seen.

If a sensor is available to determine the properties of the material, a recording of the data determined by the sensor and associated identification data for the sample container is carried out in a data memory during sampling, if desired, together with data relating to the position of sampling (EP 1 378 742 A2).

When analyzing agricultural materials, a near-infrared sensor does not store the raw data provided by the sensor (i.e., the intensities of the measured light as a function of the wavelength), but derived data with regard to the ingredients (in georeferenced manner), as described, for example, in DE 199 22 867 A1. It can therefore be assumed that in the prior art (Ewers et al., loc. cit., EP 1 378 742 A2) only the ingredient data derived from the raw data are stored together with the data for sample identification and, if desired, the position data.

However, for the creation of calibration data or other purposes, such as validation of sensors or troubleshooting, it makes sense to also save the raw data. In the prior art, a manual procedure is provided for this purpose, which includes a start of the recording of the raw data (possibly from several sensors, e.g., a near-infrared sensor for ingredients and a sensor for detecting the proportion of non-cracked grains in a forage harvester, cf. EP 2 232 978 A1) by operator input, manual adjustment of the position of an ejection spout for placing a sample on the ground of the field, a manual input of the data with regard to the sampling into a memory and finally stopping of the forage harvester and a filling of the sample into a container. This approach is cumbersome, time-consuming and error-prone.

SUMMARY

A data recording and sampling arrangement for an agricultural machine in which a material stream is recorded, processed, stored and/or delivered during operation is provided. The data recording and sampling arrangement includes a sensor arrangement to detect properties of the material in the material flow, which includes a sensor interacting with the material and a processing device which is configured to generate a signal regarding one or more properties of the material on the basis of a raw data signal emitted by the sensor, means for taking a sample of the material from the material stream, operable by an actuator, which are set up to place the sample at a desired deposition location, and an electronic control unit connected to the sensor arrangement and the actuator in a signal-transferring manner. The control unit is configured to perform the following steps in response to a triggering signal: (a) instruct the actuator to place the means in a position for sampling at the desired deposition location; (b) start a recording of the raw data in a memory; (c) after the sample has been deposited at the deposition location, stop recording the raw data and instruct the actuator to return the means from the sampling position to an inactive position, and (d) store identification data to identify the sample together with the raw data in memory.

In this way, the disadvantages mentioned at the beginning are avoided, because all steps are carried out by the control unit in an automated manner.

The control unit may be connected in a signal-transferring manner to a detection device which is set up to provide information regarding a distance between the desired deposition location and a current deposition location of the sample and/or to detect that the sample is deposited at the desired deposition location. The control unit may be configured to start recording the raw data only as soon as the detection device signals that the distance falls below a certain threshold value or the material flow is deposited at the desired deposition location. Thus, the recording of the raw data only starts when the sample will deposited at the desired deposition location in the foreseeable future. This provides that the sample and the stored data belong together.

The detection device may be configured to measure the distance and/or placement of the sample at the desired location (e.g., by a camera and an image processing system that identifies the desired deposition location and the current deposition location in the image signal of the camera) and/or to determine on the basis of the position of the actuator, i.e. to estimate where the material is directed to, and based on this, to determine whether the sample is already being placed at the desired location or not.

The control unit may be configured to control the actuator on the basis of the signals of the detection device, i.e., align the means for taking the sample on the basis of the signals of the detection device to the desired deposition location of the sample.

The desired deposition location for the sample may be on the ground or in a container attached to a harvested goods transport vehicle.

In one implementation, the agricultural machine is a forage harvester, and the actuator can be coupled with an ejection spout of the forage harvester. However, separate means of sampling can be also provided for, as described in EP 1 378 742 A2.

The detection device may be configured to detect the harvest flow emitted by the ejection spout and/or the position of the ejection spout (or part thereof, e.g., the flap at the outer end).

The sensor arrangement may include a near-infrared sensor and/or a sensor for detecting whole and/or cracked grains with a camera and an image processing system, the raw data being the recorded spectra and/or images of the camera.

The trigger signal may be generated by an operator via an operator interface and/or by means of the signals of the sensor arrangement.

The above features and advantages and other features and advantages of the present teachings are readily apparent from the following detailed description of the best modes for carrying out the teachings when taken in connection with the accompanying drawings.

DETAILED DESCRIPTION

Those having ordinary skill in the art will recognize that terms such as "above," "below," "upward," "downward," "top," "bottom," etc., are used descriptively for the figures, and do not represent limitations on the scope of the disclosure, as defined by the appended claims. Furthermore, the teachings may be described herein in terms of functional and/or logical block components and/or various processing steps. It should be realized that such block components may be comprised of any number of hardware, software, and/or firmware components configured to perform the specified functions.

Terms of degree, such as "generally", "substantially" or "approximately" are understood by those of ordinary skill to refer to reasonable ranges outside of a given value or orientation, for example, general tolerances or positional relationships associated with manufacturing, assembly, and use of the described embodiments.

As used herein, "e.g." is utilized to non-exhaustively list examples, and carries the same meaning as alternative illustrative phrases such as "including," "including, but not limited to," and "including without limitation." As used herein, unless otherwise limited or modified, lists with elements that are separated by conjunctive terms (e.g., "and") and that are also preceded by the phrase "one or more of," "at least one of," "at least," or a like phrase, indicate configurations or arrangements that potentially include individual elements of the list, or any combination thereof. For example, "at least one of A, B, and C" and "one or more of A, B, and C" each indicate the possibility of only A, only B, only C, or any combination of two or more of A, B, and C (A and B; A and C; B and C; or A, B, and C). As used herein, the singular forms "a", "an" and "the" are intended to include the plural forms as well, unless the context clearly indicates otherwise. Further, "comprises," "includes," and like phrases are intended to specify the presence of stated features, steps, operations, elements, and/or components, but do not preclude the presence or addition of one or more other features, steps, operations, elements, components, and/or groups thereof.

Figure 1:
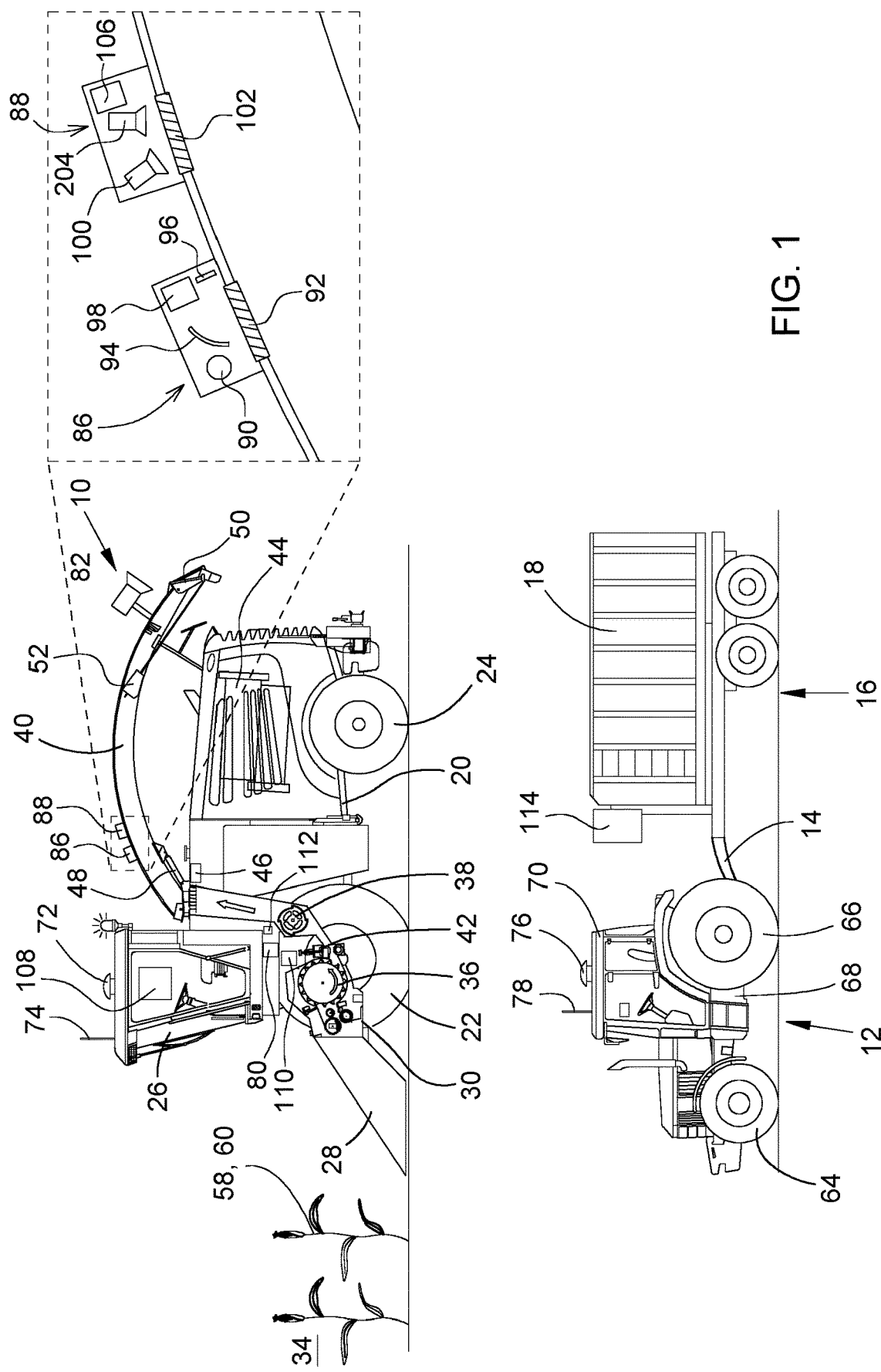
FIG. 1 is a lateral view of an agricultural machine and a transport vehicle for chopped crops.

Referring to the Figures, wherein like numerals indicate like parts throughout the several views, a combination shown in FIG. 1 includes a (first) agricultural machine 10 in the manner of a self-propelled forage harvester and a (second) agricultural machine 12 in the manner of a self-propelled tractor, which by means of a drawbar 14 pulls a trailer 16 comprising a loading container 18.

The first agricultural machine 10 is based on a frame 20, which is supported by front driven wheels 22 and steerable rear wheels 24. The operation of the first agricultural machine 10 is carried out from a driver's cab 26, from which a harvest attachment 28 in the form of a corn reaping attachment attached to an infeed channel 30 on the front of machine 10 is visible. By means of the harvest attachment 28 material (harvested crop) taken up from a field 34 is fed via an infeed conveyor arranged in the infeed channel 30 with prepress rollers to a chopping drum 36, which chops it into small pieces and provides it to a blower 38. Between the chopping drum 36 and the blower 38 extends a post-processing device 42 with two kernel processor rollers. The drive of the above-mentioned, driveable units of agricultural machine 10 and harvest attachment 28 is carried out by means of a combustion engine 44. The material emitted by the blower 38 leaves the first agricultural machine 10 to the adjacent loading container 18 via an ejection spout 40 which is rotatable by means of a first actuator 46 around an approximately vertical axis and by means of a second actuator 48 adjustable in inclination, the discharge direction of which can be changed by a flap 50, the inclination of which is adjustable by means of a third actuator 52.

The second machine 12 and the trailer 16 are of conventional construction. The second machine 12 includes front steerable wheels 64 and rear driven wheels 66, which are supported on a frame 68 that carries a driver's cab 70.

Figure 2:
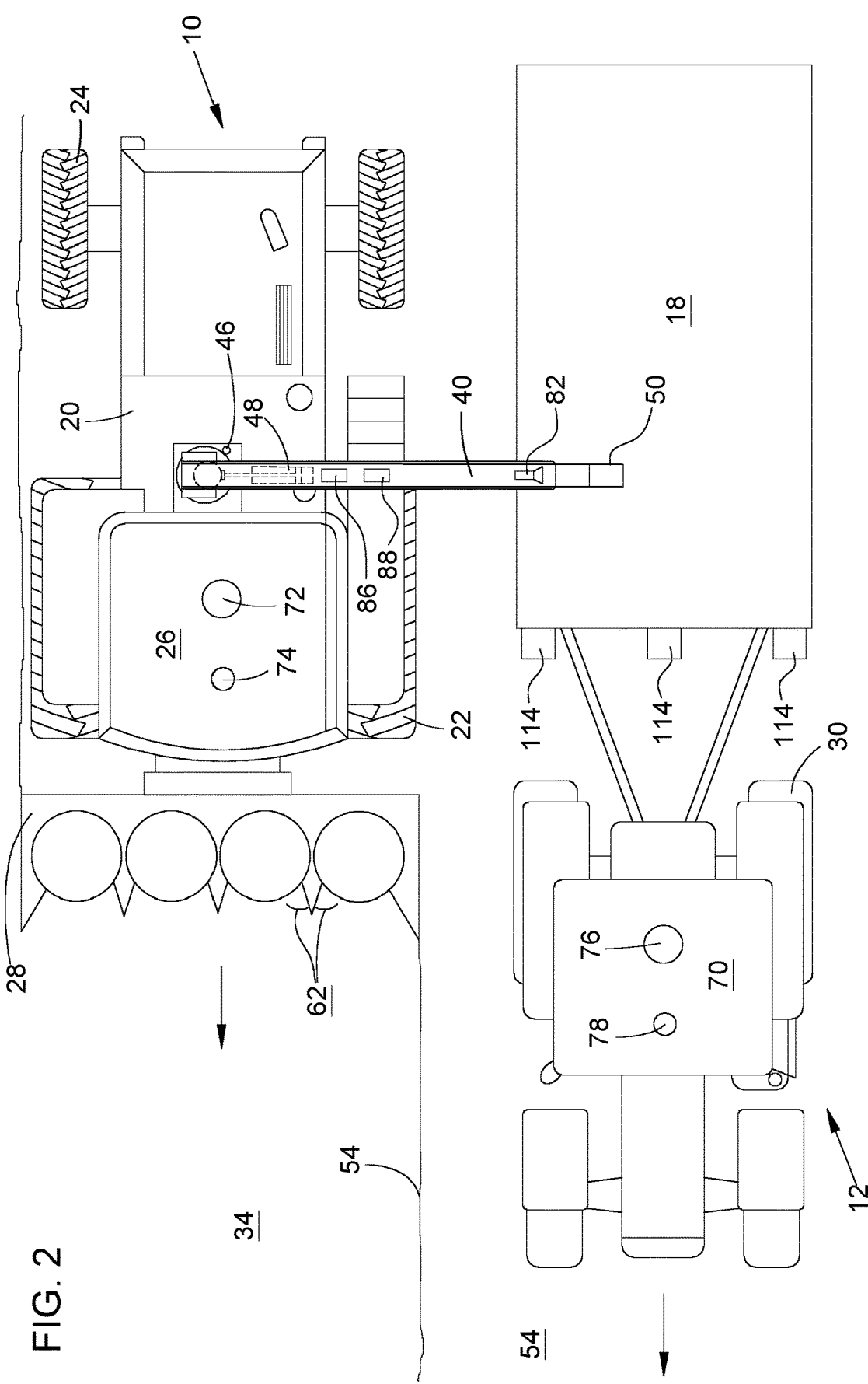
FIG. 2 a schematic top view of the agricultural machine and the transport vehicle, which carry out a harvesting and transfer process together in a field.

In FIG. 2, the first agricultural machine 10 and the second agricultural machine 12 are reproduced in a top view. It can be seen that the first agricultural machine 10 travels along a crop edge 54, which represents a boundary between the harvested area 56 of field 34 and the still standing stock 60 of field 34 occupied by maize plants 58, and that harvests the plants 58. The second machine 12 runs on the harvested part 56 of the field parallel to the first agricultural machine 10 along a path on which the plants chopped by the agricultural machine 10 pass through the ejection spout 40 into the loading container 18. The second machine 12 therefore runs parallel to the first agricultural machine 10; however especially when entering the field, the second machine 12 can also drive behind the first agricultural machine 10, since there is not yet a harvested part 56 of field 34 on which the transport vehicle 12 could drive without damaging the plants standing there.

The first agricultural machine 10 is steered by a driver sitting in the driver's cab 18 or by a known self-acting steering device connected in particular to a row sensor 62. The first agricultural machine 10 is equipped with a first positioning device 72, which is located on the roof of cabin 26. A first radio antenna 74 is also positioned there. The second machine 12 is equipped with a second positioning device 76, which is located on the roof of cabin 70. A second radio antenna 78 is also positioned there.

In a manner known per se, the steering and speed control of the second machine 10 can be carried out by an electronic control unit 80 of the first machine 10, which transmits speed and steering signals via the radio antennas 74, 78 to a control unit 84 of the second machine 12 on the basis of the positions measured with the positioning devices 72, 76 and transmitted by the radio antennas 74, 78. Alternatively or additionally, the steering and speed control of the second machine 12 can be carried out by means of a camera 82, which is mounted at the top of the outer end of the ejection spout 40 and looks at the loading container 18. An image processing system provided with an output signal of the camera 82 detects the level of the material in the loading container 18 and its contours and, if necessary, provides steering and speed signals, which the control unit 80 transmits via the radio antennas 74, 78 to the control unit 84. The information provided by the camera 82 and the image processing system regarding the level and position of the loading container 18 are also used by the control unit 80 for the automatic control of actuators 46, 48 and 52. For further details, please refer to DE 10 2012 211 001 A1, the disclosure of which is included by reference in the present documents.

On the ejection spout 40, a first sensor arrangement 86 and a second sensor arrangement 88 are provided on the top.

The first sensor arrangement 86 is designed as a near-infrared sensor and comprises a light source 90, which sends light through a window pane 92 into the inside of the ejection spout 40 and the material located there, a dispersive element 94, which decomposes light reflected by the material into different wavelengths, a light-sensitive sensor 96 with several elements, each assigned to a part of the wavelength range to be examined and an evaluation device 98, which is signal-transferring connected to the control unit 80, e.g. via a bus. The evaluation device 98 is set up to determine the content of the material of certain ingredients, such as moisture, protein content, etc., on the basis of stored calibration data. For this purpose, reference should be made to the prior art according to DE 199 22 867 A1, the disclosure of which is included by reference in the present documents. The evaluation device 98 is also able to transmit the raw data (intensity of the light received by the sensor 96 depending on the wavelength) to the control unit 80. The evaluation device 98 usually transmits the data at a certain clock frequency to the control unit 80, e.g., at a rate of 1 Hz.

The second sensor arrangement 88 is designed as a camera device and comprises a lighting device 100, which illuminates the inside the ejection spout 40 and the material located therein through a window pane 102 with light, a camera 104 looking at the material, which generates an image of the material and an evaluation device 106, which is connected in a signal-transmitting manner to the control unit 80, e.g., via a bus. The evaluation device 106 is set up to determine the content of the crop of uncracked and/or cracked kernels. In this regard, reference should be made to the prior art according to EP 2 232 978 A1, the disclosure of which is included by reference in the present documents. The evaluation device 106 is also able to transmit the raw data (camera images) to the control unit 80. The evaluation device 106 usually transmits the data at a certain clock frequency to the control unit 80, e.g. at a rate of 1 Hz. It would also be conceivable to accommodate both sensor arrangements 86, 88 in a single housing, see EP 1 956 361 A2, the disclosure of which is included by reference in the present documents.

The control unit 80 is connected to an operator interface 108, which includes display and input means. With the display means, the properties of the material determined by the evaluation devices 98, 106 of the first and/or second sensor device 86, 88 (ingredients and proportion of cracked and/or uncracked grains, the latter in any units, like number of uncracked grains in the image or their share in the volume or mass flow) can be displayed by the control unit 80. These properties can also be stored georeferenced by the control unit 80 (using the signals of the positioning device 72) in a memory 112. The signals of the evaluation device 98 and/or 106 can also be used to control an actuator 110 for adjusting a working parameter of the post-processing device 42 (see DE 10 2018 213 215 A1 and EP 1 956 361 A2).

The properties of the material determined by the sensor arrangements 86, 88 are stored in a georeferenced manner in memory 112 as described. Its contents can be sent via the radio antenna 74 to a distanced location, or it is written to a transportable storage medium, which serves to evaluate the data of the memory and can possibly serve as a basis for decision-making for further agricultural measures.

For various reasons, it may be desirable to take a sample from the material flow conveyed in machine 10. This sample may later be examined or analyzed elsewhere in order to determine the properties of the material determined by the sensor a second time as accurately as possible, e.g., by chemical analysis to determine the ingredient contents and by sieving or counting to determine the proportions of the cracked and/or uncracked grains, and to compare the result of the examination with that of one or both of the sensor arrangements 86, 88. The result of the investigation may be used to create calibration data for one or both of the evaluation devices 98, 106, or to test the sensor arrangements 86 and/or 88 or to identify possible errors. According to the present embodiment, this sampling is carried out automatically by the control unit 80, as discussed below on the basis of FIG. 3.

After starting in step 300, step 302 asks whether the operator intends a sampling mode, for which a corresponding question can be made by the display devices of the operator interface 104 and an answer by its input medium. If sampling mode is not desired, the process ends in step 332, while otherwise step 304 follows.

In step 302, further parameters can also be queried and entered, e.g., over which period the samples are to be taken and over what period of time the associated data of the sensor arrangements 86, 88 should be recorded. It is also possible to choose from which sensor arrangement 86, 88 the data is to be recorded. In step 302, other criteria can also be entered that lead to sampling, such as "Sensor displays unknown/implausible measured values" or "Sampling every x seconds". As a result, sampling can be initiated if the properties determined by one or both sensor arrangements 86, 88 deviate from expected properties (contained in the calibration data) or are not plausible, i.e. deviate significantly from previous properties, or samples are taken according to certain time sequences (thus, it can be proceeded as described in EP 2 591 654 A1). Further, in step 302 can be input whether also recording of the material properties determined by the evaluation units 98 and/or 108 that were derived from the raw data to be recorded, should take place.

Step 304 asks whether the throughput through machine 10 is greater than a threshold. The throughput can be determined in a known manner by the distance between the lower and upper prepress rollers in infeed channel 30, or by any other means. If the throughput is not greater than the threshold, step 306 follows, indicating to the user that sampling is currently not possible, followed by step 304, and otherwise step 308.

In step 308, the properties of the material determined by the sensor arrangements 86 and/or 88 are displayed by the display devices of the operator interface 108. In addition, a field "Sampling" is displayed, which can be activated by the input means. The operator can thus view the determined properties of the material and if he is of the opinion that a sample should be taken, activate the field "Sampling" by the input means in step 310, i.e., initiate a sampling. As long as this is not the case, step 304 follows again and otherwise step 312. Step 312 also follows if one of the above criteria is met, which can be defined in step 302.

In step 312, the position of the ejection spout 40 is stored, i.e., data is stored in a memory on the basis of which the control unit 80 is able to bring the actuators 46, 48 and 52 later (in step 326) back into the position they had in step 312. For this purpose, sensors for detecting the position of the actuators 46, 48, 52 are used or known target positions of the actuators 46, 48, 52 of the control unit 80.

This is followed by step 314, in which it is queried whether an automatic (i.e., based on the signals of the camera 82 and its image processing system) control of the actuators of the ejection spout 40 is possible (i.e. whether such a control is provided for by hard- and software and can be operated under the existing light and environmental conditions) or not. If this is not the case, step 318 follows and otherwise step 316.

In step 316, the image processing system of the camera 82 tries to find a container 114 in the images that is suitable for taking samples. Such a container 114 is arranged in FIGS. 1 and 2 at the front of the transport container 18 and may be designed, for example, as a bucket or the like. If the image processing system does not find a container 114 (or if all visible containers are already filled with samples), step 318 follows and otherwise step 320.

In step 320, the ejection spout 40 is brought by suitable control of the actuators 46, 48 and 52 by the control unit 80 in a position in which the container 114 is filled with the material flowing in the ejection spout 40. The sample is thus automatically filled into container 114.

In step 318, on the other hand, the actuator 52 adjusts the flap 50 to an inward-swivel position. The sample is thus placed on the ground next to machine 10.

In step 322, which follows steps 320 and 318, the control unit 80 records the raw data of the evaluation devices 98 and/or 106 of the sensor arrangements 86 and/or 88 in memory 112, in particular together with the position data from the positioning device 72 and/or the properties of the material determined by the evaluation devices 98 and/or 106. Step 322 is preferably started exactly when the control unit 80 detects on the basis of the signals of the image processing system of the camera 82 that the material is almost directed into the container 114 or recognizes on the basis of the signals of a sensor to detect the position of the actuator 52 that the flap 50 has approximately reached the inner end position. This avoids a premature start of data acquisition and the storage of data that does not belong to the sample.

In step 324, it is queried whether the sampling took place over a specified time (in step 302), and if this is not the case, step 322 follows again and otherwise step 326.

Figure 3:
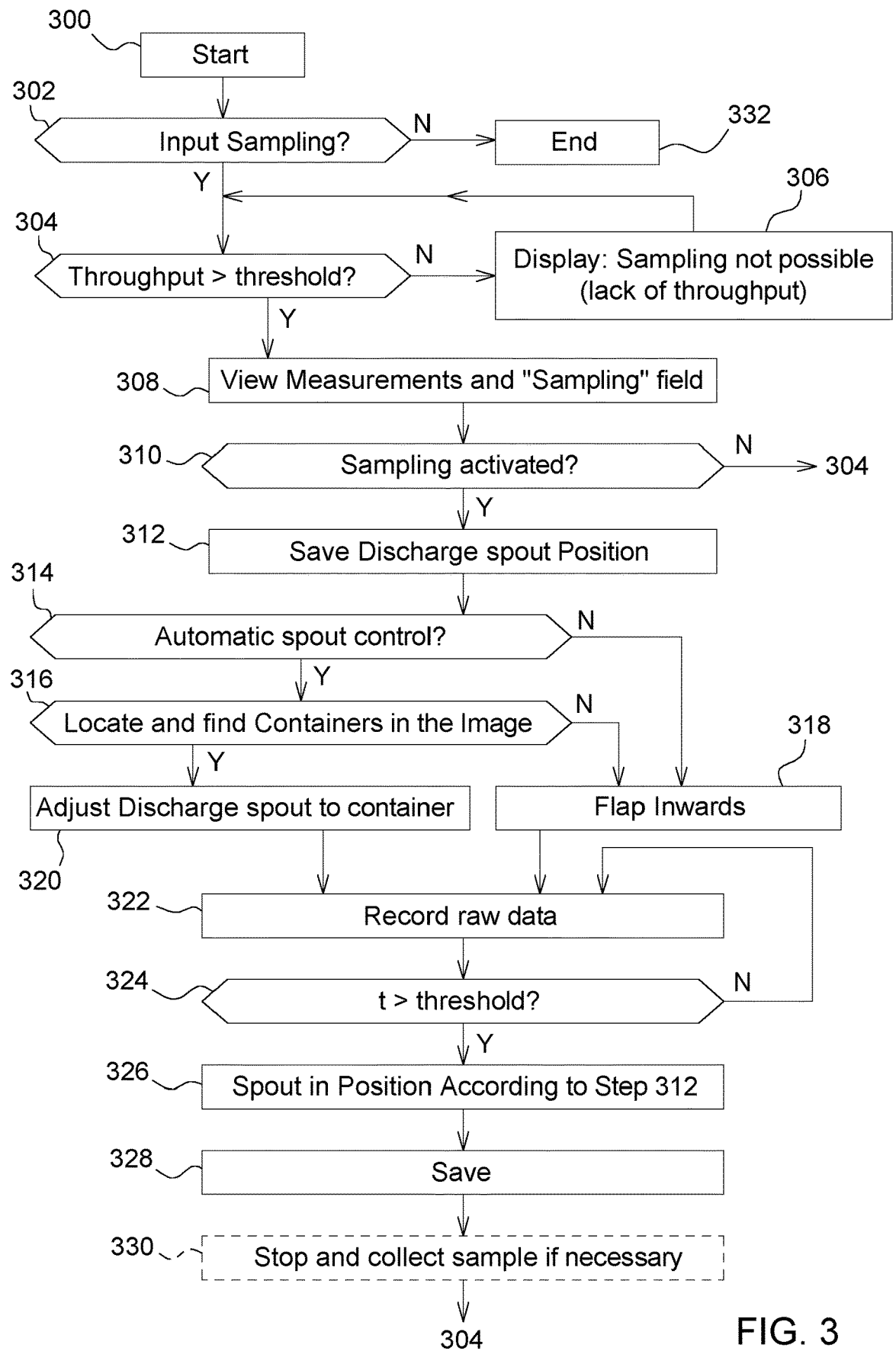
FIG. 3 a flowchart according to which the control unit of the agricultural machine works.

In step 326, the ejection spout 40 is returned to the position stored in step 312 by appropriate control of actuators 46, 48 and 52 and step 328 follows, in which the data from step 322 (possibly together with the data from the evaluation units 98, 106 discussed above regarding step 302) are stored in a common file, together with data by which the sample can be identified later, e.g., a specific number that can be written on the container 114 or a bag to receive the sample. The data from step 326 are stored separately from the geo-referenced data stored in memory 112 during normal operation and can be transmitted in the manner describe above—analogously to the georeferenced data—to any remote location. For the purpose of sample identification, any solutions are possible, such as recording an RFID label or printing a label with a bar or QR code that can be adhered to the container 114 or the bag or otherwise attached to it. Steps 326 and 328 can be performed simultaneously or in reverse order as shown in FIG. 3.

In step 330, which can be done when step 318 has been passed, i.e., when the sample is placed on the bottom of the field, the machine 10 can be stopped automatically or by its operator (for example after a note on the display of the operator interface 108) and the operator fills the sample into a container. This step 330 can also be carried out by the operator of machine 12 or any other person who, for example, can obtain data regarding the position via a mobile phone and be directed there, whether during the harvesting of the field or afterwards. Step 330 is followed by step 304.

The detailed description and the drawings or figures are supportive and descriptive of the disclosure, but the scope of the disclosure is defined solely by the claims. While some of the best modes and other embodiments for carrying out the claimed teachings have been described in detail, various alternative designs and embodiments exist for practicing the disclosure defined in the appended claims.

What is claimed is:

1. Arrangement for data recording and sampling for an agricultural machine in which a material stream is received, processed, stored or delivered during operation, the arrangement for data recording and sampling comprising:
    a sensor arrangement for detecting properties of the material in the material flow, comprising a sensor interacting with the material and a processing device, which is configured to generate a signal with regard to one or more properties of the material on the basis of a raw data signals provided by the sensor;
    a spout for dispensing a sample of the material from the material stream, which is actuatable by an actuator and arranged to place the sample at a desired deposition location; and
    an electronic control unit connected to the sensor arrangement and the actuator in a signal-transferring manner;
    wherein the control unit is configured to perform the following steps in response to a trigger signal:
        (a) instruct the actuator to bring the spout into a position for sampling;
        (b) starting a recording of the raw data in a memory;
        (c) after the sample has been deposited at the deposition location, stop recording the raw data and instruct the actuator to return the spout from the sampling position to an inactive position; and
        (d) save identification data to identify the sample together with the raw data in the memory.

2. The arrangement for data recording and sampling according to claim 1, wherein the control unit is connected to a detection device which is set up to provide information with regard to a distance between the desired deposition location and a current storage location of the sample and/or to recognize that the sample is deposited at the desired deposition location.

3. The arrangement for data recording and sampling according to claim 2, wherein the control unit is configured to begin the recording of the raw data only as soon as the detection device signals that the distance falls below a certain threshold value or the material flow is deposited at the desired deposition location.

4. The arrangement for data recording and sampling according to claim 3, wherein the detection device is configured to determine on the basis of the position of the actuator the placement of the sample at the desired location.

5. The arrangement for data recording and sampling according to claim 4, wherein the control unit is configured to control the actuator on the basis of the signals of the detection device.

6. The arrangement for data recording and sampling according to claim 5, wherein the depositing location is one of on the ground or in a container attached to a transport vehicle for crops.

7. The arrangement for data recording and sampling according to claim 6, wherein the agricultural machine is a forage harvester.

8. The arrangement for data recording and sampling according to claim 7, wherein the detection device is configured to detect one of the crop flow emitted by the spout or the position of the spout.

9. The arrangement for data recording and sampling according to claim 8, wherein the sensor arrangement comprises one of a near-infrared sensor or a sensor for the detection of whole or cracked kernels with a camera and an image processing system, and wherein the raw data is the recorded spectra or images of the near-infrared sensor or the camera.

10. The arrangement for data recording and sampling according to claim 9, wherein the trigger signal can be generated by one of an operator via an operator interface or on the basis of the signals of the sensor arrangement.

* * * * *